United States Patent
Chang et al.

(10) Patent No.: US 10,762,000 B2
(45) Date of Patent: Sep. 1, 2020

(54) TECHNIQUES TO REDUCE READ-MODIFY-WRITE OVERHEAD IN HYBRID DRAM/NAND MEMORY

(71) Applicant: Samsung Electronics Co., Ltd., Suwon-si, Gyeonggi-do (KR)

(72) Inventors: Mu-Tien Chang, Santa Clara, CA (US); Heehyun Nam, San Jose, CA (US); Youngsik Kim, San Jose, CA (US); Youngjin Cho, San Jose, CA (US); Dimin Niu, Sunnyvale, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 15/662,072

(22) Filed: Jul. 27, 2017

(65) Prior Publication Data

US 2018/0293175 A1  Oct. 11, 2018

Related U.S. Application Data

(60) Provisional application No. 62/483,910, filed on Apr. 10, 2017.

(51) Int. Cl.
| | | |
|---|---|---|
| *G06F 12/121* | (2016.01) | |
| *G06F 12/127* | (2016.01) | |
| *G06F 13/16* | (2006.01) | |
| *G06F 12/0868* | (2016.01) | |

(52) U.S. Cl.
CPC ........ *G06F 12/121* (2013.01); *G06F 12/0868* (2013.01); *G06F 12/127* (2013.01); *G06F 13/16* (2013.01); *G06F 2212/1024* (2013.01); *G06F 2212/1041* (2013.01); *G06F 2212/214* (2013.01); *G06F 2212/6022* (2013.01)

(58) Field of Classification Search
CPC ... G06F 12/0833; G06F 12/121; G06F 12/126
See application file for complete search history.

(56) References Cited

U.S. PATENT DOCUMENTS

| | | | |
|---|---|---|---|
| 9,529,707 B2 | 12/2016 | Nakamura et al. | |
| 9,720,835 B1 * | 8/2017 | Shilane | ................ G06F 12/0833 |
| 2002/0188808 A1 * | 12/2002 | Rowlands | ............... G06F 7/582 |
| | | | 711/133 |

(Continued)

FOREIGN PATENT DOCUMENTS

WO    WO 2015/004570 A1    1/2015

*Primary Examiner* — Tuan V Thai
*Assistant Examiner* — Alexander J Yoon
(74) *Attorney, Agent, or Firm* — Lewis Roca Rothgerber Christie LLP

(57) ABSTRACT

A method of choosing a cache line of a plurality of cache lines of data for eviction from a frontend memory, the method including assigning a baseline replacement score to each way of a plurality of ways of a cache, the ways respectively storing the cache lines, assigning a validity score to each way based on a degree of validity of the cache line stored in each way, assigning an eviction decision score to each way based on a function of the baseline replacement score for the way and the validity score for the way, and choosing a cache line of the way having a highest eviction decision score as the cache line for eviction.

18 Claims, 3 Drawing Sheets

(56) References Cited

U.S. PATENT DOCUMENTS

| | | | |
|---|---|---|---|
| 2004/0205301 A1* | 10/2004 | Hara | G06F 12/0862 711/137 |
| 2009/0157678 A1* | 6/2009 | Turk | G06F 16/24552 |
| 2011/0276744 A1* | 11/2011 | Sengupta | G06F 12/0866 711/103 |
| 2015/0106563 A1 | 4/2015 | Hsu-Hung et al. | |
| 2016/0103729 A1* | 4/2016 | Palframan | G06F 12/0897 714/15 |
| 2016/0191250 A1 | 6/2016 | Bestler et al. | |
| 2016/0267040 A1* | 9/2016 | Barzik | G06F 13/4221 |
| 2016/0291866 A1* | 10/2016 | Olcay | G06F 3/061 |
| 2016/0350030 A1 | 12/2016 | Wu | |
| 2016/0364153 A1 | 12/2016 | Nam et al. | |
| 2017/0083474 A1* | 3/2017 | Meswani | G06F 13/4234 |
| 2018/0081590 A1* | 3/2018 | Farahani | G06F 12/0802 |

* cited by examiner

| Way # | LRU Score | Validity Score | Eviction Decision Score |
|---|---|---|---|
| Way 0 | 4 | 20 | 60 |
| Way 1 | 3 | 32 | 62 |
| Way 2 | 2 | 10 | 30 |
| Way 3 | 1 | 5 | 15 |

# TECHNIQUES TO REDUCE READ-MODIFY-WRITE OVERHEAD IN HYBRID DRAM/NAND MEMORY

CROSS-REFERENCE TO RELATED APPLICATION(S)

This application claims priority to, and the benefit of, Provisional Application No. 62/483,910, filed on Apr. 10, 2017 in the United States Patent and Trademark Office, the contents of which are incorporated herein in their entirety by reference.

BACKGROUND

1. Field

Some embodiments of the present disclosure relate generally to memory device structures, and to methods of memory device management.

2. Description of the Related Art

In the field of memory storage, datacenters that store large amounts of memory seek to accomplish high capacity, high performance, low power usage, and low cost. Flash memory may be a viable candidate for datacenters, as flash memory, when compared to dynamic random-access memory (DRAM), is able to provide high capacity and efficient power usage at reduced cost. For example, flash memory is able to provide terabytes of storage per module, which is 10 times larger than what can be achieved using DRAM technology. Additionally, flash memory uses lower standby power.

Unfortunately, flash memory, when compared to DRAM, typically provides weaker performance while also having more limited endurance. For example, certain types of flash memory (e.g., ZNAND) may have latency for read and write operations that is significantly longer than that achieved using DRAM technology.

SUMMARY

Some embodiments of the present disclosure provide methods of memory management operations, including read-modify-write with reduced overhead and reduced power consumption, and a memory device capable of performing the methods.

According to some embodiments, there is provided a method of choosing a cache line of a plurality of cache lines of data for eviction from a frontend memory, the method including assigning a baseline replacement score to each way of a plurality of ways of a cache, the ways respectively storing the cache lines, assigning a validity score to each way based on a degree of validity of the cache line stored in each way, assigning an eviction decision score to each way based on a function of the baseline replacement score for the way and the validity score for the way, and choosing a cache line of the way having a highest eviction decision score as the cache line for eviction.

The baseline replacement score may correspond to recency of use of the cache line of the way or frequency of use of the cache line of the way.

The method may further include assigning a weighted factor to the validity score, or assigning a weighted factor to the baseline replacement score.

The method may further include storing the weighted factor corresponding to the validity score in a register, or storing the weighted factor corresponding to the baseline replacement score in a register.

The method may further include programming the register storing the weighted factor corresponding to the validity score, or programming the register storing the weighted factor corresponding to the baseline replacement score.

The baseline replacement score may be a random score, and the method may further include generating the random score with a random number generator.

The method may further include determining the validity score by reading valid bits of each cache line, and running a tally of valid bits of each cache line.

The method may further include evicting the cache line chosen for eviction.

According to some embodiments, there is provided a memory cache controller for implementing a pre-read operation with a memory module, the memory cache controller being configured to determine whether a backend memory or a frontend memory is busy, when neither the backend memory nor the frontend memory is busy, index a write buffer metadata of a write buffer based on a write buffer set counter, read valid bits of the write buffer, determine whether all cache lines of the write buffer are fully valid, when all of the cache lines of the write buffer are determined to be fully valid, increment the write buffer set counter by 1, when less than all of the cache lines of the write buffer are determined to be fully valid, select a cache line of the write buffer that is not fully valid as a replace line for eviction, pre-read the replace line from the backend memory, and increment the WB set counter by 1.

According to some embodiments, there is provided a method of performing a read-modify-write operation with a memory module, the method including determining when to perform a pre-read operation based on a degree of busyness of a backend memory and based on a degree of busyness of a frontend memory, and determining which cache line to pre-read based on validity of cache lines of a write buffer.

Determining when to perform the pre-read operation may include maintaining a miss status handling register (MSHR) for tracking outstanding requests sent to a media controller of the backend memory.

The method may further include sending a read request to the backend memory to perform the pre-read operation when the MSHR is below a threshold.

The threshold may be based on a characteristic of the backend memory.

The method may further include adjusting the threshold based on operating conditions.

Determining which cache line to pre-read based on validity of cache lines of the write buffer may include reading valid bits of the write buffer.

Reading valid bits of the write buffer may include selecting a set of data in a cache of the frontend memory, individually selecting each line of the set, and inspecting validity of data of each selected line.

The method may further include selecting a cache line within the set of data for eviction based on a baseline replacement score and a data validity score.

The method may further include monitoring a transaction queue in a controller of the frontend memory, wherein the degree of busyness of the frontend memory corresponds to the transaction queue.

Determining which cache line to pre-read may occur after determining that the degree of busyness of the frontend memory is below a first threshold and that the degree of busyness of the backend memory is below a second threshold.

The method may further include maintaining a WB set counter, and selecting a line of a set of data in a cache of the frontend memory for eviction based on the WB set counter.

Accordingly, because the ZDIMM of embodiments of the present disclosure is able to provide a weighted balance between baseline replacement policies and data validity, the embodiments provide a novel method for selection of data for eviction, and are thereby able to reduce power overhead of RMW operations while improving system performance.

BRIEF DESCRIPTION OF THE DRAWINGS

Some embodiments can be understood in more detail from the following description taken in conjunction with the accompanying drawings, in which.

DETAILED DESCRIPTION

Figure 1:
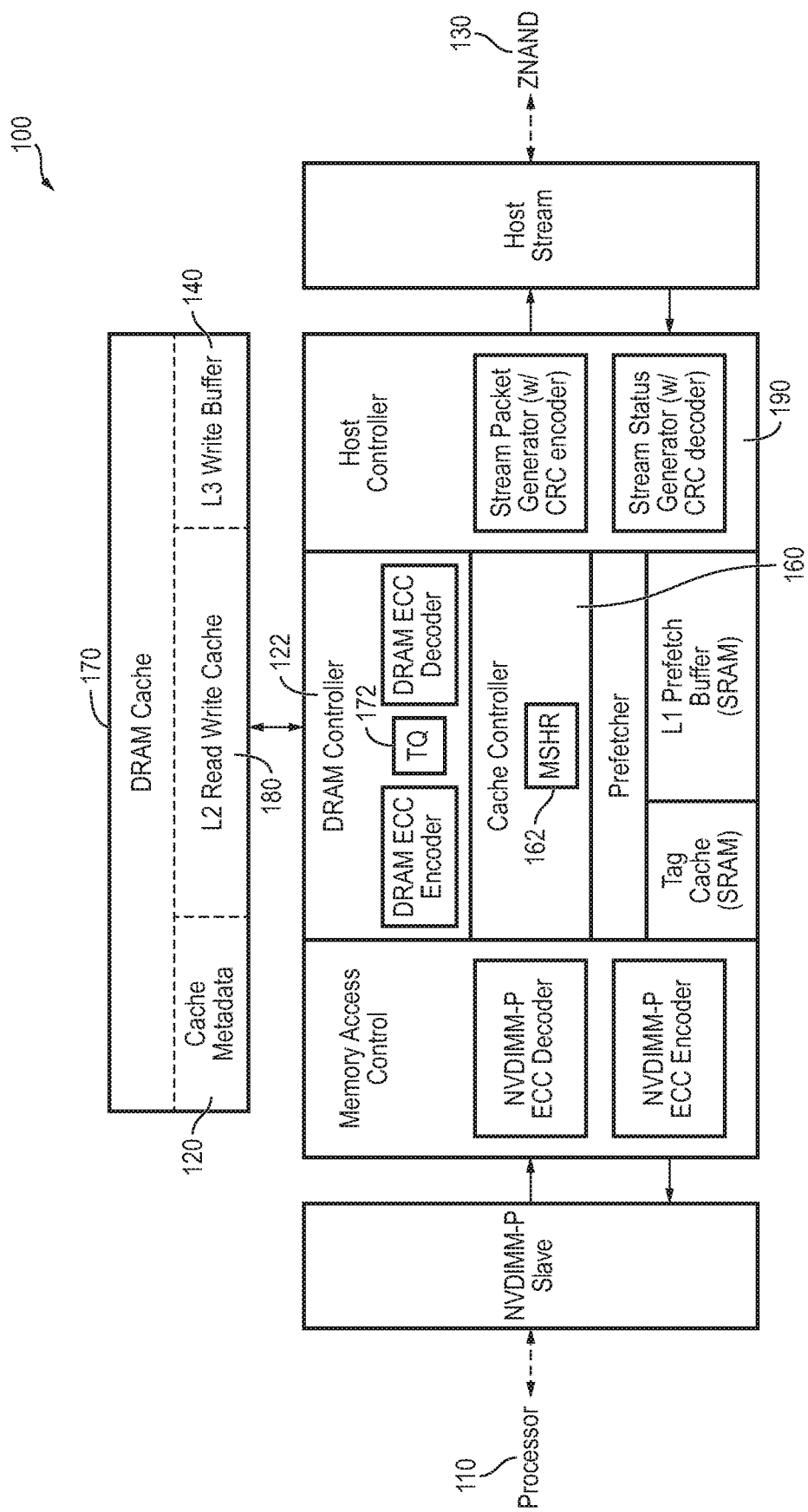
FIG. 1 is a block diagram of a ZNAND dual in-line memory module (ZDIMM), according to an embodiment of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As described above, RMW operations introduce performance overhead and power overhead. Embodiments of the present disclosure provide methods for reducing RMW overhead.

Figures 2, 3:
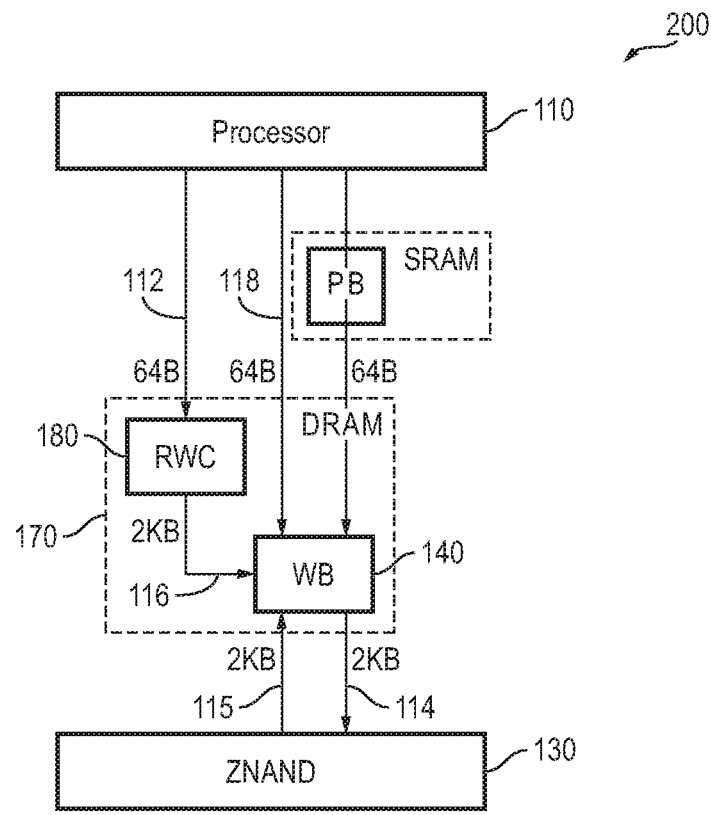
FIG. 2 is a block diagram depicting a write operation, according to an embodiment of the present disclosure.
FIG. 3 is an example of a table for selecting a Way of a data cache for data eviction based on a weighted eviction policy, according to an embodiment of the present disclosure.

FIG. 1 is a block diagram of a ZNAND dual in-line memory module (ZDIMM), according to an embodiment of the present disclosure. FIG. 2 is a block diagram depicting a write operation, according to an embodiment of the present disclosure.

Referring to FIG. 1, a ZNAND dual in-line memory module (ZDIMM) 100 includes a dynamic random-access memory (DRAM) cache/DRAM 170, which operates as a cache memory, and a ZNAND-type of flash memory (e.g., a ZNAND 130), which operates as a main memory, on a single memory module 100. The DRAM 170 includes a read/write cache (RWC) 180 that is optimized for read operations, and also includes a write buffer (WB) 140 that is optimized for write operations.

The ZDIMM 100 further includes a cache controller 160, and also includes a host controller 190 for connecting to the ZNAND 130, which operates as a high capacity backend memory storage.

Although the following disclosure references the ZDIMM 100 shown in the figures, embodiments of the present invention can be applied to any hardware architecture that has the following characteristics: (1) the presence of two or more memory types, where one of the memory types acts as a cache memory of another one of the memory types as a main memory; (2) the access granularity of the cache memory is smaller than the granularity corresponding to the main memory, and read-modify-write operations are used to maintain consistency of data; and (3) operations by the main memory are slower than operations by the cache memory.

Referring to FIG. 2, memory management of the ZDIMM 100, including read-modify-write (RMW) operations, has previously run into limitations. These limitations are due to the fact that a write request 112 from a processor 110 has a granularity of 64 bytes (64B), while (for ZNAND technology) the granularity of the writeback 114 of the WB 140 corresponds to a 2-kilobyte (2 KB) cache line 114. Accordingly, for data to be written 114 to the ZNAND 130, the data has to be written 114 in a 2 KB chunk. Furthermore, to perform an update with respect to, for example, only 64 B out of the 2 KB cache line, all of the data of the 2 KB cache line is read from the ZNAND 130 to a cache layer (e.g., the RWC 180), and then the entire 2 KB is written back 114 to the ZNAND 130, thereby causing unwanted overhead as a result of the read operation.

It should be noted that for instances where the cache access granularity is smaller than the main memory access granularity, read-modify-write operations are not necessarily beneficial. For example, in DRAM, updating 8 B of a 64 B block is possible because DRAM is byte-addressable and is able to write using "in-place write."

Contrastingly, NAND is not byte-addressable, and a NAND write operation is "out-of-place," meaning that a write operation does not directly update the memory page holding the data. Instead, a new page is allocated for the write operation, and the old page is invalided. Accordingly, if the write granularity is smaller than the page size, some useful data could be unwantedly invalidated.

RMW operations are managed at the cache layer. This means when the cache controller writes 2 KB data from the write buffer (WB) to the ZNAND, the 2 KB data should be fully valid. As a result, if the 2 KB data in the WB 140 is only partially valid (e.g., because the processor 110 writes 118 to the WB 140 in 64 B granularity), the cache controller 160 should read from the ZNAND 130 to obtain the rest of the valid data to thereby make the 2 KB fully valid. That is, the cache controller 160 may first read from the ZNAND 130 to obtain the rest of the valid data, and may fill the entirety of the 2 KB chunk of data to make a fully valid 2 KB line of cache data.

Accordingly, RMW operations introduce performance overhead and power overhead. For example, RMW requires an additional read from the ZNAND 130 to obtain valid data, and also requires an additional write 115 to the WB 140 to make the partially valid 2 KB cache line fully valid. In some embodiments, the additional write 115 may involve reading 2 KB from the ZNAND 130, and writing a portion of the 2 KB to the WB 140. Accordingly, RMW overhead can make performance worse when a ZNAND read is on the critical path, and when a ZNAND read is experiencing tail latency.

Furthermore, the DRAM 170 effectively acts as a cache. However, the capacity of the DRAM 170 is limited, and sometimes memory management may result in old data being kicked out of the DRAM 170 and sent back to the ZNAND 130 to make room for new data to come in (i.e., eviction of data). However, choosing what data to evict from the DRAM may depend on an implemented eviction policy.

Referring to FIGS. 1 and 2, embodiments of the present disclosure may use a novel weighted eviction policy to improve RMW performance. In the embodiments described below, the RMW operations may be managed at the cache layer. However, in other embodiments, there could be designs where the RMW operations are not managed at the cache layer, although the features of the embodiments described below will remain applicable regardless of what entity manages the RMW operations.

For example, with respect to RMW operations, when a 2 KB cache line that is to be evicted from the DRAM 170 (that is, if a 2 KB cache line 114 that is to be written back to the ZNAND 130) is fully valid, two things may be assumed. First, reading 115 from the ZNAND 130 to the WB 140 becomes unnecessary due to the cache line being fully valid. That is, because the fully valid 2 KB cache line is already located in the DRAM 170, there is no need to read the same data from the ZNAND 130. Second, providing data to the WB 140 for writing to the WB 140 also becomes unnecessary, because the information is already contained in the WB 140.

However, if a 2 KB cache line that is to be evicted from DRAM 170 is partially valid, then reading 115 the valid data from the ZNAND 130 is performed to ensure data consistency. That is, the reason for reading 115 from the ZNAND 130 is to ensure that the 2 KB cache line to be written back, or copied, to the ZNAND 130, is fully valid. Further, the number of writes 115 to the WB 140 depends on a validity-percentage corresponding to what percentage of that 2 KB cache line in the DRAM 170 is valid (e.g., the greater the number of valid 64 B sub-lines in the 2 KB cache line in the DRAM 170, the fewer the number of 64 B sub-lines that need to be updated by the ZNAND 130 with valid data). For example, if roughly 91% of the data of the 2 KB cache line 114 that is to be evicted from the DRAM 130 is valid, then only the remaining 9% of the data will need to be updated.

As an illustrative example, the 2 KB in the WB 140 is initially fully invalid (that is, the WB 140 is empty). After initialization, the processor 110 may write some useful data to the WB 140, thereby making some of the 64 B entries in that 2 KB valid. If the processor 110 continues to write 64 B data to the WB 140, and these 64 B data may happen to fill every one of the possible 64 B entries in that 2 KB, then the 2 KB will become fully valid. However, the processor 110 might not write that many 64 B entries to the WB 140, or the 64 B entries might not fill the entirety of the 2 KB, thereby making the 2 KB only partially valid. Thereafter, if the cache controller 160 evicts the 2 KB from the WB 140 to the ZNAND 130, RMW may be performed by reading from the ZNAND 130 the 2 KB that contains the valid 64 B data that is able to make the 2 KB in the WB 140 fully valid. The processor 110 is not involved in the RMW process.

Accordingly, the present embodiment utilizes the concept of validity when deciding which cache line will be evicted. An eviction decision for determining which cache line to evict may be both a function of a baseline eviction/replacement policy, and a function of cache line validity (e.g., a function of the number of valid 64 B sub-lines in an analyzed 2 KB ZNAND cache line). That is, embodiments of the present disclosure provide a new eviction policy used in conjunction with old, traditional eviction policies. This may be accomplished by basing an eviction decision on two factors—the baseline replacement policy, and cache line validity.

For example, if only a traditional baseline replacement policy is considered in determining which data to evict from the DRAM, there may be a large number of RMW operations (e.g., due to eviction of a cache line having many invalid entries).

Similarly, if only cache line validity is considered in determining which data to evict, a cache line may be undesirably immaturely evicted (e.g., cache lines that will be good for future cache line reuse may be evicted, requiring that the cache lines be reloaded again). For example, it may be beneficial to reuse a cache line, and evicting a most recently loaded cache line may increase the likelihood that the evicted cache line will be accessed again, and will thereafter need to be loaded up again. Accordingly, it may be beneficial to evict cache lines that aren't used, or that are less frequently used, over cache lines that are used more frequently, in some cases.

FIG. 3 is an example of a table for selecting a Way of a data cache for data eviction based on a weighted eviction policy, according to an embodiment of the present disclosure.

Referring to FIG. 3, by considering both a baseline replacement policy and cache line validity in determining which data to evict, according to embodiments of the present disclosure, RMW overhead is reduced. The example of a weighted eviction policy of the present embodiment is provided as follows.

As an example of the present embodiment, a four-way cache is used as an example of the DRAM 170. The baseline replacement policy of the present example is a least recently used (LRU) replacement policy. The first way (e.g., Way 0) of the four-way cache may have an LRU score of 4 on a scale of 1 to 4 (indicating that the first way was the least recently used), the second way (e.g., Way 1) may have an LRU score of 3, the third way (e.g., Way 2) may have an LRU score of 2, and the fourth way (e.g., Way 3) may have an LRU score of 1 (indicating that the fourth way is the most recently used). It should be noted that, in other embodiments, the DRAM 170 may have differing numbers of ways, and different scales for ranking the individual ways may be used. It should also be noted that, in other embodiments, differing baseline replacement policies may be used (e.g., least frequently used (LFU), first-in first-out (FIFO), random, etc.).

In the present example, cache line validity is determined by a validity score, which may simply be a sum of the number of valid 64 B sub-lines of the analyzed 2 KB cache line. In the present example, the first way has a validity score of 20 (e.g., out of 32 64-byte sub-lines of the cache line, 20 of the sub-lines are valid), the second way has a validity score of 32 (e.g., the 2-kilobyte cache line is fully valid, meaning that all 32 sub-lines therein are valid), the third way has a validity score of 10, and the fourth way has a validity score of 5.

The present embodiment may perform an eviction decision by weighting either or both of the baseline replacement policy score (the LRU score in the present example) and the validity score of each of the respective ways, by adding the two weighted scores for each of the ways together to have a respective summed score/eviction decision score for each way, and then choosing the way with the highest eviction decision score for eviction of the data stored therein.

In the present example, the eviction decision score may be equal to the LRU score multiplied by x and added to the validity score multiplied by y (i.e., (x*LRU score)+(y*validity score)), where x and y are weighted factors. In the present example shown in FIG. 3, x is equal to 10, and y is equal to 1, but other weights may be used, and will vary by specific use. Accordingly, the eviction decision score for the first way is 60 (10*4+1*20), the eviction decision score for the second way is 62 (10*3+1*32), the eviction decision score for the third way is 30 (10*2+1*10), and the eviction decision score for the fourth way is 15 (10*1+1*5).

Accordingly, because the second way in the present example has the highest eviction decision score, the second way is the way whose data is chosen to be evicted. Accordingly, the present embodiment is able to provide a novel approach to determining an eviction decision by balancing a traditional baseline replacement policy with an eviction/replacement policy based on a degree of validity of an analyzed cache line stored in each of a plurality of given ways.

To implement the weighted eviction policy of the present embodiment, a replacement score may be, for example, an LRU score (e.g., a score based on timing of the use of the data of each way), an LFU score (e.g., a score based on a frequency of use of the data in each way), or a FIFO score, any of which can be obtained by replacement bits. Alternatively, the replacement score can be a random score, which can be obtained by random number generator (e.g., the baseline replacement scores for each way may be random, and may be added to the value obtained from their weighted validity score). Similar approaches may be used for other replacement policies, such as nMRU (not most recently used) or any other existing replacement policies that may be implemented by the cache controller 160 of the ZDIMM 100.

Furthermore, the validity score may be determined by simply reading the valid bits, and running a tally of valid bits per cache line/way. Also, it should be noted that the eviction decision score may be adjusted by making the weighted factors (e.g., x and y) programmable and stored in registers, and may be implemented by using logic (e.g., by implementing multiply-add hardware).

With respect to another embodiment of the present disclosure, as previously noted, RMW overhead can hinder performance when a ZNAND read is on a critical path, and when the ZNAND read is experiencing tail latency. As will be described below, the present embodiment can enable a pre-read operation to avoid a critical path read and tail latency. This may be accomplished by selectively choosing when to pre-read, and selectively choosing what to pre-read. That is, according to another embodiment, by conducting a pre-read operation, RMW overhead may be reduced to avoid worsening performance otherwise caused by reading data to avoid a critical path read and to avoid tail latency.

For example, conditions regarding a pre-read may be a function of ZNAND busyness, DRAM busyness, a WB set index, and/or replacement policy. The function may indicate that pre-read of the ZNAND 130 should occur when the ZNAND 130 is not busy, that valid bits of the WB 140 should be checked when the frontend DRAM 170 is not busy, that the cache lines should be pre-updated evenly across sets, and, within a set, the cache line that is most likely to be evicted in the future should be pre-updated.

In more detail, the present embodiment may be implemented such that occurrences of when to pre-read may depend on ZNAND (backend memory) busyness and DRAM (frontend memory) busyness.

As a function of ZNAND busyness, when the ZNAND 130 is too busy, then it may be undesirable to perform a pre-read operation. However, when the ZNAND 130 is idle, then pre-reading from the ZNAND 130 doesn't negatively impact system performance. Accordingly, in the present embodiment, to determine when to conduct a pre-read operation, the cache controller 160 may maintain a "miss status handling register" (MSHR) 162 for tracking outstanding requests sent to a ZNAND media controller. By monitoring the MSHR 162, the cache controller 160 can estimate the busyness of the ZNAND 130 (e.g., a large number of outstanding requests to the ZNAND 130 may indicate that the ZNAND 130 is busy at that time). Accordingly, if the MSHR 162 indicates that the number of outstanding requests to the ZNAND 130 is less than a threshold number (e.g., a ZNAND request threshold number), then a read request may be sent to the ZNAND 130 for a pre-read operation. The threshold number may be an adjustable value (e.g., adjusted based on operating conditions). For example, by performing diagnostic testing, and by sending results of the diagnostic testing to the cache controller 160, the cache controller may determine that the threshold number is set too high (e.g., the performance of the ZNAND 130 may be unacceptably low due to busyness resulting from a number of outstanding requests despite the threshold number indicating that the ZNAND 130 is not expected to be busy). Accordingly, the cache controller 160 may reduce the threshold number such that the updated threshold number indicates the ZNAND 130 is busy even when having fewer outstanding requests. Also, the threshold may be predefined based on characteristics of the ZNAND 130 (e.g., based on characteristics of the backend memory).

After determining when to conduct a pre-read operation, the cache controller 160 can determine which cache line to pre-read (e.g., which location in the cache to pre-read) based on an estimation of DRAM busyness. Accordingly, the cache controller 160 may read the WB valid bits to determine which cache line to pre-read. By reading the WB valid bits, the cache controller 160 may avoid pre-reading cache lines that are fully-valid. Reading WB valid bits may be accomplished by the cache controller 160 having DRAM metadata access, which may be stored in cache metadata 120. This may be enabled by a DRAM cache controller/DRAM controller 122 located above the cache controller 160 in the cache layer.

Also, the DRAM controller 122 may have a transaction queue 172, and may store all outstanding commands sent to the DRAM 170. The DRAM controller 122 may monitor the transaction queue 172 in the DRAM controller 122 to estimate the busyness of the DRAM 170. To ensure that the cache controller's access to the DRAM metadata does not affect critical DRAM cache access, the DRAM controller 122 may monitor the transaction queue 172 in the DRAM controller 122 to estimate the busyness of the DRAM 170. If a number of outstanding requests to the DRAM 170 are less than a threshold number (e.g., a DRAM request threshold number), the cache controller 160 may send a read request to the DRAM 170 to read the valid bits of the cache lines. As with the ZNAND request threshold number, the DRAM request threshold number may be a value that is programmable or that is predefined based on one or more characteristics of the DRAM 170.

According to the present embodiment, and based on the above, a pre-read operation may only happen if neither the ZNAND 130 nor the DRAM 170 are busy. That is, the present embodiment has a protocol of determining what to pre-read only when it is determined that both the number of outstanding requests sent to the ZNAND media controller is below the ZNAND request threshold, and the number of outstanding requests sent to the DRAM 170 is below the DRAM request threshold.

In determining what to pre-read (e.g., which location in the DRAM cache 170), a WB set index may be used. The cache controller 160 may determine which of the cache lines to pre-read by the cache controller 160 first selecting a given set of data, and then selecting a line of that data. That is, the cache controller 160 may select a plurality of ways of the DRAM cache 170. Then, the cache controller 160 may implement a weighted eviction policy (e.g., the weighted eviction policy described with respect to FIG. 3) to make a weighted eviction decision with respect to one of the plurality of ways of the DRAM cache 170. Thereafter, the cache controller 160 may pre-read the line of data contained in the corresponding way.

After selecting the given set of data, the cache controller 160 may implement one of many selection protocols, such as a round robin set selection protocol. For example, the cache controller 160 may look at a first row/set of data, then a next row, until a last row is inspected, and then the first row may be inspected by the cache controller 160 again. In inspecting each of the rows/sets of data, the cache controller 160 may determine which way of the ways of each corresponding one of the rows is to be targeted for eviction (e.g., based on a baseline replacement policy, such as LRU). However, if the cache controller 160 concludes, upon inspecting the way targeted for eviction, that the targeted way is fully valid, the cache controller may then move onto a next suitable way (e.g., a second least recently used way) until finding a way that is not fully valid. Accordingly, the cache controller may use the round robin set selection protocol to assess the validity of the ways of each inspected row, or set, of data, and to select one or more ways for eviction.

To implement the round robin set selection protocol, the cache controller 160 may maintain a counter that corresponds to the WB set index (e.g., the counter indicating a value of 3 may indicate selecting a third set). The counter may be incremented by 1 each time a pre-read is executed. Further, when all of the cache lines in the given set of data are fully-valid, the counter may be incremented by 1, and a second set of data may be selected by the cache controller 160.

That is, the counter of the cache controller 160 may be initialized to 1, such that the cache controller 160 selects a first set of data/a first row for inspection. The cache controller 160 may then execute a pre-read operation with respect to the first set of data, and may determine that all of the cache lines in the first set of data are fully-valid. Accordingly, the cache controller 160 may determine that there is nothing in the first set of data to pre-read, and may then increment the counter to 2. The cache controller 160 may thereafter select a second set of data for inspection in accordance with the value indicated by the counter. By repeating this process, the cache controller 160 continues to inspect the various sets of data in a "round robin" fashion.

Thereafter, a replacement policy may be implemented. For example, after the set is selected, the cache line to be selected within the set (e.g., which way) may be determined based on the aforementioned weighted eviction decision score described in the example above. The weighted eviction decisions score may be determined by an applicable baseline replacement policy and data validity. Accordingly, if the LRU policy is used as the baseline replacement policy, then the cache controller 160 may select the least recently used cache line as a target. However, if the cache line selected according to the LRU policy (i.e., the least recently used cache line) is fully valid, then the cache controller 160 can select the second-to-least recently used cache line as the target. Further, if the baseline replacement policy is random, then any random cache line that is not fully valid may be selected by the cache controller 160.

Figure 4:
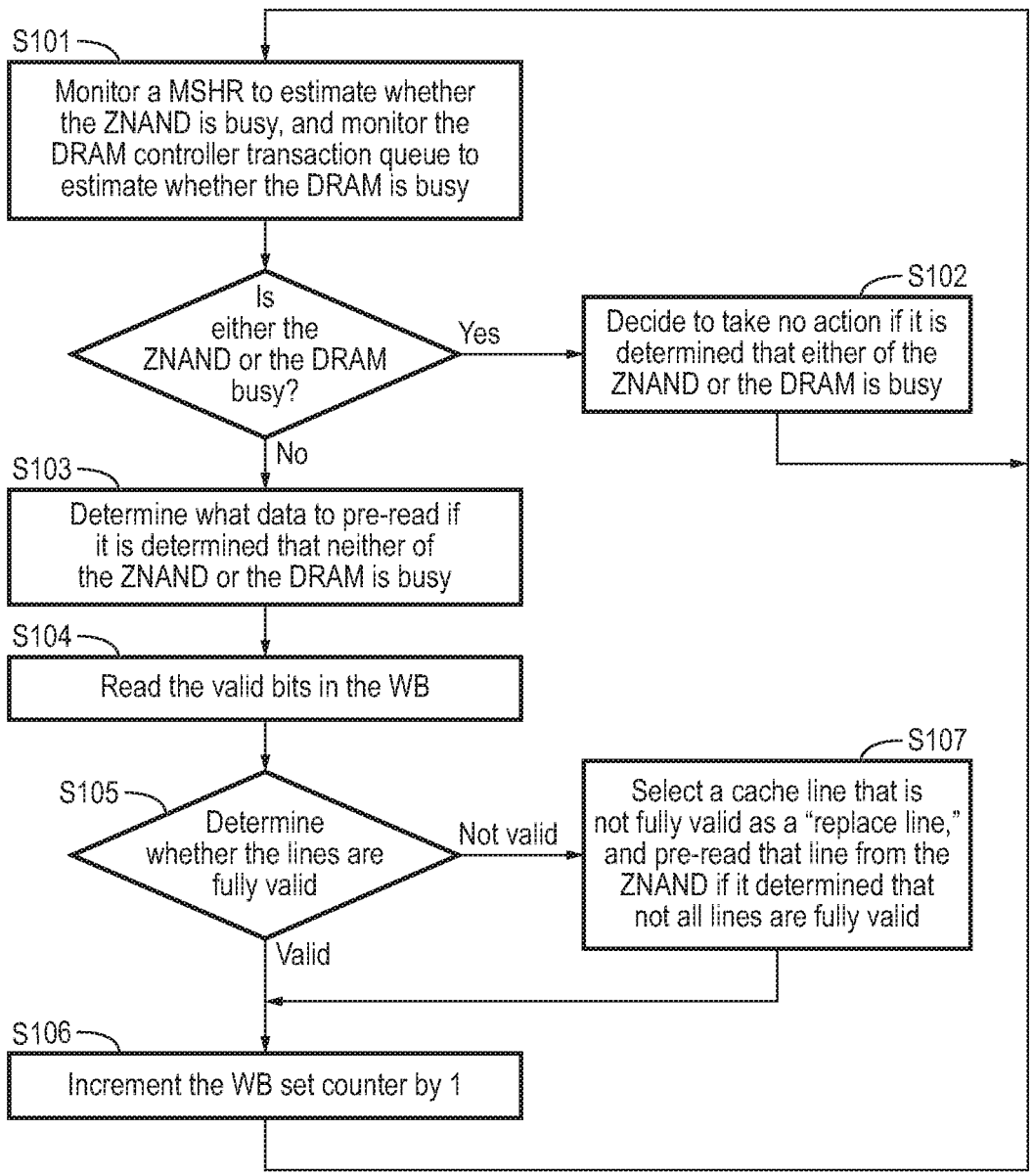
FIG. 4 is flowchart depicting an example of a method according to an embodiment of the present disclosure.

FIG. 4 is flowchart depicting an example of a method according to an embodiment of the present disclosure.

Referring to FIG. 4, and to summarize the above, according to an embodiment of the present disclosure, the cache controller 160 may first monitor a MSHR 162 to estimate whether the ZNAND 130 is busy, and may also monitor the DRAM controller transaction queue 172 to estimate whether the DRAM 170 is busy (S101). Secondly, if the cache controller 160 determines that either of the ZNAND 130 or the DRAM 170 is busy, then the cache controller 160 can decide to take no action (S102). However, and thirdly, if the cache controller 160 determines that neither of the ZNAND 130 nor the DRAM 170 is busy, then the cache controller 160 may then determine what data to pre-read (S103) (e.g. the cache controller 160 may determine which data to pre-read by indexing WB metadata based on a WB set counter to select a row of the set of data). Fourthly, the cache controller 160 may then read the valid bits in the WB 140 (S104). Fifthly, the cache controller 160 determines whether the lines are fully valid (S105). When the cache controller 160 determines from reading the valid bits that all lines are fully valid, then the WB set counter may be incremented by 1 (S106). However, if the cache controller 160 determines that not all lines are fully valid, then the cache controller 160 may select a cache line that is not fully valid as a "replace line," and may then pre-read that line from the ZNAND 130 (S107). Thereafter, the cache controller 160 may increment the WB set counter by 1 (S108), and may return to monitoring the busyness of the DRAM controller 122 and the busyness of the ZNAND 130 (S101).

Accordingly, embodiments of the present disclosure provide a weighted eviction policy to reduce read-modify-write (RMW) overhead and power consumption. Further, the described embodiments provide an eviction decision function based on a replacement score, a validity score, and respective weights associated with each score.

Furthermore, embodiments of the present disclosure provide a pre-read function that enables avoiding a worst-case performance impact of RMW, and may be based on ZNAND busyness, DRAM busyness, WB set fairness, and cache line eviction likelihood.

Accordingly, the described embodiments provide a hardware implementation that executes the eviction decision function, and a hardware mechanism that executes the pre-read decision function.

What is claimed is:

1. A method of choosing a cache line of a plurality of cache lines of data for eviction from a frontend memory, the method comprising:
    assigning a baseline replacement score to each way of a plurality of ways of a cache, the ways respectively storing the cache lines;
    assigning a first weighted factor to the baseline replacement score to generate a weighted baseline replacement score;
    assigning a validity score to each way based on a degree of validity of the cache line stored in each way;
    assigning a second weighted factor to the validity score to generate a weighted validity score;
    assigning an eviction decision score to each way based on a function of the weighted baseline replacement score for the way and the weighted validity score for the way; and
    choosing a cache line of the way having a highest eviction decision score as the cache line for eviction.

2. The method of claim 1, wherein the baseline replacement score corresponds to recency of use of the cache line of the way or frequency of use of the cache line of the way.

3. The method of claim 1, further comprising evicting the cache line chosen for eviction from DRAM.

4. The method of claim 1, further comprising adjusting either the weighted factor corresponding to the validity score or the weighted factor corresponding to the baseline replacement score according to a user input.

5. The method of claim 1, wherein the baseline replacement score is a random score, the method further comprising generating the random score with a random number generator.

6. The method of claim 1, further comprising:
    determining the validity score by reading valid bits of each cache line; and
    running a tally of the valid bits of each cache line.

7. The method of claim 1, further comprising evicting the cache line chosen for eviction.

8. A memory cache controller for implementing a pre-read operation with a memory module, the memory cache controller being configured to:
    determine whether a backend memory is busy based on whether a number of outstanding requests to the backend memory meets a backend memory threshold number;
    determine whether a frontend memory is busy based on a number of outstanding requests to the frontend memory meets a frontend memory threshold number;
    based at least in part on determining that neither the backend memory nor the frontend memory is busy, index a write buffer metadata of a write buffer based on a write buffer set counter for counting a write buffer set index;
    read valid bits of the write buffer;
    determine whether all cache lines of the write buffer are fully valid;
    determine that all of the cache lines of the write buffer are determined to be fully valid, and increment the write buffer set counter by 1;
    determine that less than all of the cache lines of the write buffer are determined to be fully valid;
    select a cache line of the write buffer that is not fully valid as a replace line for eviction, wherein the cache line is selected based on determining that the number of outstanding requests to the frontend memory fails to meet a first threshold number and that the number of outstanding requests to the backend memory fails to meet a second threshold number;
    pre-read the replace line from the backend memory; and
    increment the write buffer set counter by 1.

9. A method of performing a read-modify-write operation with a memory module, the method comprising:
    determining a backend degree to which a backend memory is occupied by an outstanding backend workload, the backend degree corresponding to a number of outstanding requests to the backend memory;
    determining a frontend degree to which a frontend memory is occupied by an outstanding frontend workload, the frontend degree corresponding to a number of outstanding requests to the frontend memory;
    performing a pre-read operation based, at least in part, on the backend degree and the frontend degree; and
    determining which cache line to pre-read based on validity of cache lines of a write buffer and based on determining that the number of outstanding requests to the frontend memory fails to meet a first threshold number and that the number of outstanding requests to the backend memory fails to meet a second threshold number.

10. The method of claim 9, wherein performing the pre-read operation comprises maintaining a miss status handling register (MSHR) for tracking the outstanding requests sent to a media controller of the backend memory.

11. The method of claim 10, further comprising determining that the outstanding requests sent to a media controller of the backend memory fails to meet a threshold number, and sending a read request to the backend memory to perform the pre-read operation.

12. The method of claim 11, wherein the threshold number is based on a characteristic of the backend memory.

13. The method of claim 11, further comprising adjusting the threshold number based on operating conditions.

14. The method of claim 9, wherein determining which cache line to pre-read based on validity of cache lines of the write buffer comprises reading valid bits of the write buffer.

15. The method of claim 14, wherein reading valid bits of the write buffer comprises:
    selecting a set of data in a cache of the frontend memory;

individually selecting each line of the set; and inspecting validity of data of each selected line.

16. The method of claim 15, further comprising selecting a cache line within the set of data for eviction based on a baseline replacement score and a data validity score.

17. The method of claim 9, further comprising monitoring a transaction queue in a controller of the frontend memory, wherein the frontend degree corresponds to the transaction queue.

18. The method of claim 9, further comprising:

maintaining a write buffer set counter for counting a write buffer set index; and selecting a line of a set of data in a cache of the frontend memory for eviction based on the write buffer set counter.

* * * * *